No. 807,506. PATENTED DEC. 19, 1905.
A. SCHWARZ.
PROCESS OF CONCENTRATING ORES.
APPLICATION FILED NOV. 4, 1904.
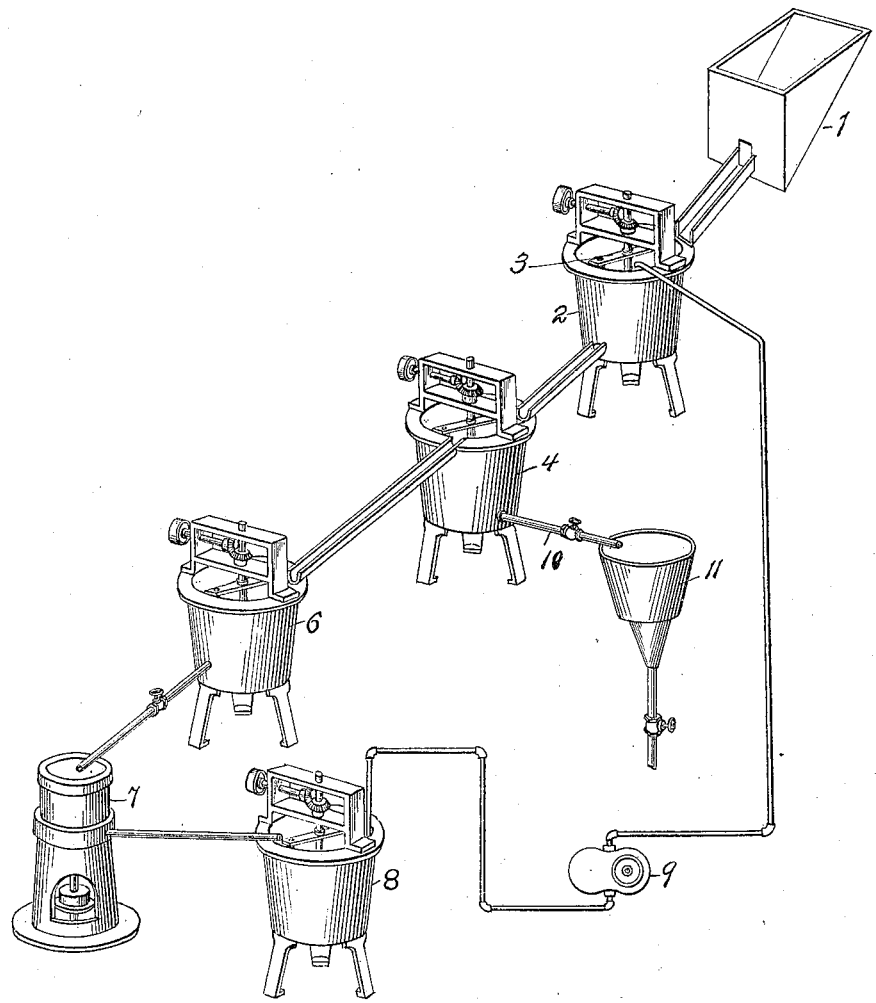

UNITED STATES PATENT OFFICE.

ALFRED SCHWARZ, OF NEW YORK, N. Y., ASSIGNOR TO SCHWARZ ORE TREATING COMPANY, OF PHŒNIX, ARIZONA TERRITORY, A CORPORATION OF ARIZONA TERRITORY.

PROCESS OF CONCENTRATING ORES.

No. 807,506.      Specification of Letters Patent.      Patented Dec. 19, 1905.

Application filed November 4, 1904. Serial No. 231,395.

*To all whom it may concern:*

Be it known that I, ALFRED SCHWARZ, a subject of the German Emperor, and a resident of the borough of Manhattan, city, county, and State of New York, have invented certain new and useful Improvements in Processes of Concentrating Ores, of which the following is a specification.

The present invention relates to the concentration of ores, and has for its object to effect the separation and recovery of the concentrates in a cheap and efficient manner.

In carrying out my invention the ore is first pulverized and in its dry condition or mixed with water in any suitable quantity mixed with a melted resinous hydrocarbon, such as resin, pitch, or asphaltum. The resinous hydrocarbon may be first melted and then added to the ore, or it may be added in solid form to the mass of ore and heat applied to bring it to a melted condition. The admixture of hydrocarbon and ore may be effected by any suitable mechanical means, and, if desired, air, steam, or gas may be injected into the mass either alone or to assist the mechanical agitation. The injection of such agent results in the hydrocarbon taking up an appreciable quantity of air or gas, giving a certain sponginess which increases its floating power. A sufficient quantity of resinous hydrocarbon is added to make with the ore a pasty mass, the containing vessel being heated in any suitable manner to maintain the hydrocarbon in a melted condition. Agitation of the mass is continued long enough to effect and maintain a thorough and intimate mixture of all parts of the ore with the adhesive agent. After the mixing operation the concentrates may be recovered in various ways. Thus, for example, the entire contents of the mixing vessel may be run into boiling water or water heated at a point sufficient to keep the adhesive agent in a melted condition. The heat is maintained for a sufficient length of time, usually several minutes, depending upon the character of the ore treated, when the earthy or rocky constituents of the ore are liberated and washed out and settle in the bottom of the vessel. The resinous hydrocarbon entraps and buoys up the metallic constituents of the ore and as it rises to the surface may be floated or screened off and run to a centrifugal drier for the separation of the concentrates therefrom. After the removal of the concentrates from the centrifugal drier they may be heated, if desired, with a caustic soda or potash solution for the removal of any remaining portions of the adhesive agent.

The water used to effect the above separation may be made acid or alkaline in the treatment of certain classes of ores to increase the action of the adhesive agent.

Instead of running the mixture of ore and adhesive agent to a separate vessel to be treated with hot or boiling water cold water may be stirred into the mass and heat applied to raise it to the desired temperature.

The recovery of the concentrates may be effected by injecting cold water into the mass of ore and adhesive agent. By such method the adhesive agent will solidify or granulate and with the entrapped metallic constituents of the ore may be floated or screened off and subsequently subjected to the action of heat, whereby the adhesive agent is melted and may be separated from the concentrates by a centrifugal drier, filter-press, or other suitable means. The tailings washed out by the cold water precipitate in the bottom of the vessel and may be collected as desired.

Either of the above methods of separating the concentrates and tailings may be carried out by discharging the mixture of ore and adhesive agent upon a screen suspended in a body of cold, heated, or boiling water. Upon agitating the water either by a plunger or by jigging the screen the adhesive agent with the entrapped metallic constituents remaining above the screen may be collected and run off to separate and recover the concentrates in the manner above stated.

Of the resinous hydrocarbons I prefer to use resin; but combinations of two or more such hydrocarbons are included within the scope of the invention. I also include those resinous hydrocarbons which are more or less viscid at normal temperatures, as well as those which are normally solid. In such case if sufficiently viscid to be properly mixed with the ore further liquefaction by heat will not be necessary.

Instead of previously melting the hydrocarbon it may be added to the ore in its normal condition and the mass then heated and agitated for the purpose of liquefying the hydrocarbon and of effecting a mixture thereof with the ore.

The accompanying drawing shows in perspective one arrangement of apparatus by which the process may be carried out.

1 designates a bin or hopper, from which the pulverized ore is discharged into a vessel 2, provided with an agitator 3. In this vessel the pulverized ore and the melted resinous hydrocarbon are intimately mixed, the said vessel being steam-jacketed or otherwise heated to maintain the said hydrocarbon in a liquid condition. The separation of the hydrocarbon with its entrapped values may be effected in the vessel 4 with either cold or hot water. If heated water is employed, the resinous hydrocarbon will be maintained in its liquid condition and with the entrapped values will rise to the surface of the water and may be run into a storage vessel 6 and from there to a centrifugal drum 7. The recovered hydrocarbon may be collected in a storage vessel 8, from which it is raised by a pump 9 to the mixing vessel 2. If cold water is employed as the separating medium, the resinous hydrocarbon will be solidified or granulated and after it has been screened or floated off from the vessel 4 is remelted and run into the centrifugal drum 7 for the recovery of the values. The tailings may be drawn off from the vessel 4 by a pipe 10 into a tank 11.

What I claim, and desire to secure by Letters Patent, is—

1. The process of concentrating ores consisting in melting a normally solid resinous hydrocarbon, mixing the pulverized ore therewith and separating said hydrocarbon with its entrapped values from the tailings, and finally recovering the values from the resinous hydrocarbon.

2. The process of concentrating ores which consists in melting a normally solid resinous hydrocarbon, mixing the pulverized ore therewith, treating the mixture with water to separate said hydrocarbon with its entrapped values from the tailings, and finally recovering the values from the resinous hydrocarbon.

3. The process of concentrating ores consisting in melting a normally solid resinous hydrocarbon, mixing the pulverized ore therewith, treating the mixture with heated water to separate said hydrocarbon with its entrapped values from the tailings, and finally recovering the values from the resinous hydrocarbon.

4. The process of concentrating ores consisting in adding to the pulverized ore a normally solid resinous hydrocarbon, heating and agitating the mass to liquefy the hydrocarbon and to effect a mixture therewith with the ore, separating said hydrocarbon with its entrapped values from the tailings, and finally recovering the values from the resinous hydrocarbon.

5. The process of concentrating ores consisting in mixing melted resin with the pulverized ore, separating the resin with its entrapped values from the tailings, and finally recovering the values from the resin.

6. The process of concentrating ores consisting in mixing melted resin with the pulverized ore, treating the mixture with heated water to maintain the resin in a melted condition and to separate the same with its entrapped values from the tailings, and finally recovering the values from the resin.

In testimony whereof I have hereunto signed my name in the presence of two subscribing witnesses.

ALFRED SCHWARZ.

Witnesses:
EDWARD T. MAGOFFIN,
CHARLES S. JONES.